United States Patent [19]

Hersum

[11] Patent Number: 5,301,106
[45] Date of Patent: Apr. 5, 1994

[54] ACTION ITEM DOCKETING DEVICE

[76] Inventor: Mark T. Hersum, 99 North Ave., Weston, Mass. 02193

[21] Appl. No.: 826,882

[22] Filed: Jan. 28, 1992

[51] Int. Cl.⁵ .............................................. G06F 15/22
[52] U.S. Cl. .................................... 364/401; 364/406; 368/10; 368/41
[58] Field of Search ........... 364/401, 406, 402, 705.06, 364/705.07, 705.08; 368/10, 41

[56] References Cited

U.S. PATENT DOCUMENTS

| | | | |
|---|---|---|---|
| 4,588,303 | 5/1986 | Wirtschafter et al. | 368/10 |
| 5,197,042 | 3/1993 | Brookner et al. | 368/10 |
| 5,200,891 | 4/1993 | Kehr et al. | 364/413.01 |

Primary Examiner—Roy N. Envall, Jr.
Assistant Examiner—Khai Tran

[57] ABSTRACT

Action item docketing device comprises a plurality of open action item receptacles. Each receptacle has an indicator, and a detector providing a presence signal responsive to an action item in the receptacle. The device display prompts the user to enter through a keypad item due dates for the corresponding receptacles. For a receptacle, due data signals representative of a future date for action with respect to an item are stored. For each receptacle in turn, the stored due data is compared with the current date. Responsive to coincidence of the current date with the stored due date, and to an item presence signal, an output item due signal causes the corresponding indicator to be in an item due state.

6 Claims, 14 Drawing Sheets

| MESSAGE | INFORMATION DISPLAYED |
|---|---|
| 0 | " PRESS DATE KEY " |
| 1 | " PRESS TIME KEY " |
| 2 | " PRESS NAME KEY " |
| 3 | " PRESS DUE KEY " |
| 4 | " PRESS +,- OR>>" |
| 5 | "SLOT NN RESET SS" |
| 6 | "SLOT NN NAME----" |
| 7 | "TODAY DD MON YY" |
| 8 | "TIME NOW HH:MM P" |
| 9 | "NN DUE MON DD  " |
| 10 | "DUE TIME HH:MM P" |
| 11 | "ERR KEY SEQUENCE" |
| 12 | "  PROGRAM SLOT  " |
| 13 | "    SELF TEST   " |
| 14 | "                " |
| 15 | "DATE HAS EXPIRED" |

FIG. 4

| KEY NAME | CODE |
|---|---|
| NO KEY PRESS | X 1 1 1 1 1 1 1 |
| DATE KEY | X 1 1 1 1 1 1 0 |
| TIME KEY | X 1 1 1 1 1 0 1 |
| NAME KEY | X 1 1 1 1 0 1 1 |
| DUE KEY | X 1 1 1 0 1 1 1 |
| + KEY | X 1 1 0 1 1 1 1 |
| − KEY | X 1 0 1 1 1 1 1 |
| >> KEY | X 0 1 1 1 1 1 1 |
| DUE DATE MODE | 1 DAILY |
| | 0 MONTHLY |

FIG. 5

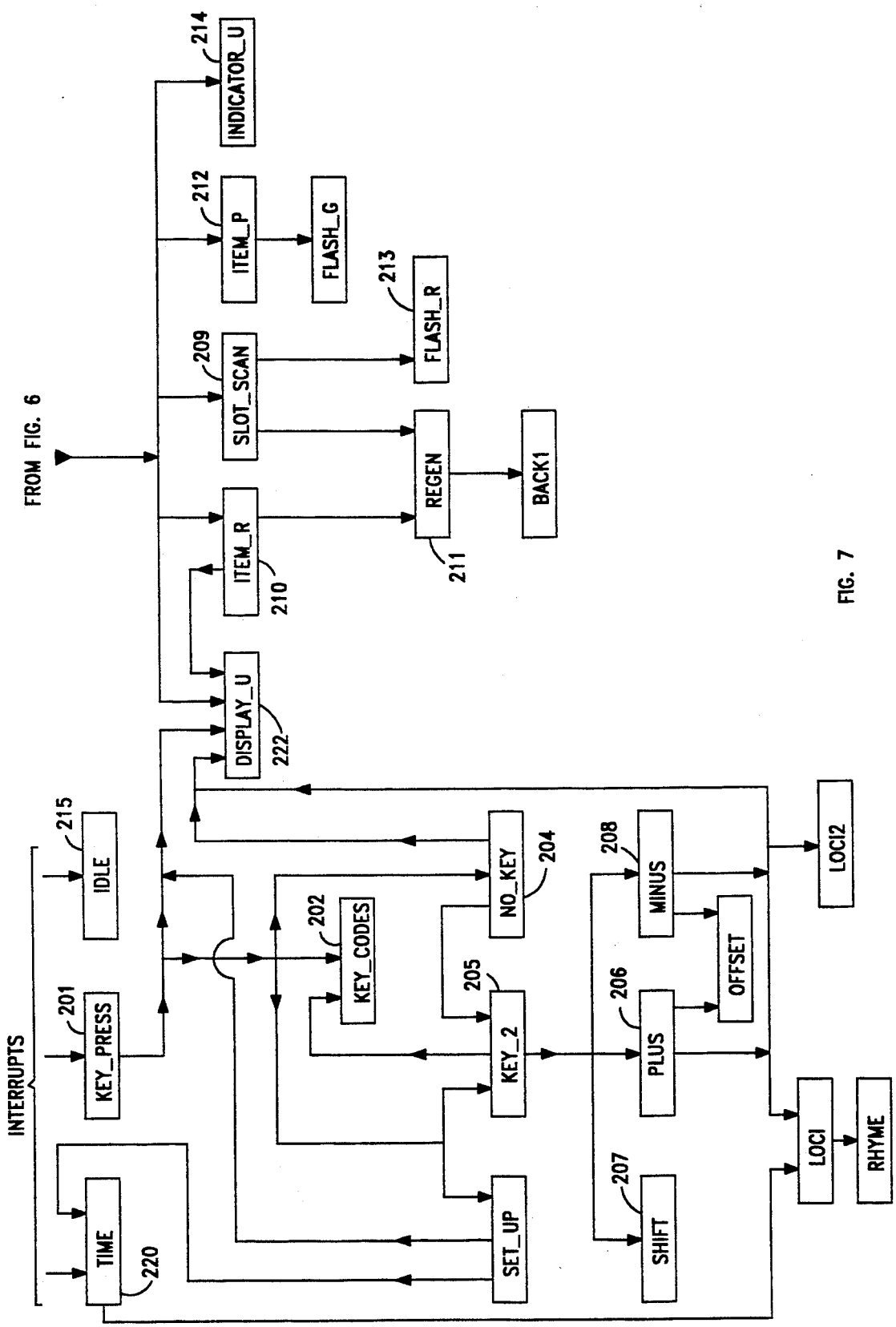

| 8 BYTES | | | | | | | |
|---|---|---|---|---|---|---|---|
| | | | | | | | |
| | | | | | | | |
| IC 8 | IC 9 | | | | | | |
| IC 0 | IC 1 | IC 2 | IC 3 | IC 4 | IC 5 | IC 6 | IC 7 |
| ← SLOT NAME 9 → | | | | | | | |
| ← SLOT NAME 8 → | | | | | | | |
| ← SLOT NAME 7 → | | | | | | | |
| ← SLOT NAME 6 → | | | | | | | |
| ← SLOT NAME 5 → | | | | | | | |
| ← SLOT NAME 4 → | | | | | | | |
| ← SLOT NAME 3 → | | | | | | | |
| ← SLOT NAME 2 → | | | | | | | |
| ← SLOT NAME 1 → | | | | | | | |
| ← SLOT NAME 0 → | | | | | | | |
| DOB H7 | DOB L7 | DOB H8 | DOB L8 | DOB H9 | DOB L9 | | |
| DOB H3 | DOB L3 | DOB H4 | DOB L4 | DOB H5 | DOB L5 | DOB H6 | DOB L6 |
| MOB 8 | DOB 9 | DOB H0 | DOB L0 | DOB H1 | DOB L1 | DOB H2 | DOB L2 |
| MOB 0 | MOB 1 | MOB 2 | MOB 3 | MOB 4 | MOB 5 | MOB 6 | MOB 7 |
| TRC | TGC | HR UTB | MIN UTB | P UTB | TEMP H1 | TEMP L1 | CORR |
| DISP PTR | SP | PP | CP | LB | L2 | | TEMP 2 |
| MO DD5 | MO DD6 | MO DD7 | MO DD8 | MO DD9 | KB | DB | MNB |
| DA DD7 | DA DD8 | DA DD9 | MO DD0 | MO DD1 | MO DD2 | MO DD3 | MO DD4 |
| DA DD0 | DA DD1 | DA DD2 | DA DD3 | DA DD4 | DA DD5 | DA DD6 | DA DD7 |
| | | | SIP H | SIP L | ST H | ST L | |
| S | 2 PTRS | TEMP | TEMP H3 | TEMP L3 | SRB | | |
| MISC BITS | FLAG +3 | TS | Y | M | D | H | MIN |
| DATE BUFFER | | | | | | | |
| TIME BUFFER | | | | | | | |
| ITEM BUFFER | | | | | | | |
| | | | | | | | |

| GROUP | SYMBOL | NAME |
|---|---|---|
| MISC BITS | GFO | GFO BIT |
| MISC BITS | MB | MINUS BIT |
| MISC BITS | P | P BIT |
| MISC BITS | PB | PLUS BIT |
| MISC BITS | SB | SHIFT BIT |
| MISC BITS | 30B | 30 BIT |
| | ST | STATUS BUFFER |
| | DAB | DATE BUFFER |
| | TB | TIME BUFFER |
| | DB | DISP BUFFER |
| | DDx | DUE DATE BUFFERS (DD0-DD9) |
| | UTB | UPDATE TIME BUFFERS |
| | KB | KEY BUFFER |
| | LB | LOCI BUFFER |
| | L2 | LOCI2 BUFFER |
| | CORR | MONTH CORRECTION BUFFER |
| | MOB | MOFFSET BUFFERS |
| | DOB | DOFFSET BUFFERS |
| | MNB | MSSG_NO BUFFER |
| | SRB | SLOT REGEN BUFFER |
| | IB | ITEM BUFFER |
| | TGC | TIMES_THRU G COUNTER |
| | TRC | TIMES_THRU R COUNTER |
| FLAG +3 | DF | DATE FLAG |
| FLAG +3 | TF | TIMEOUT FLAG |
| FLAG +3 | DDF | DUE DATE FLAG |
| 2 PTRS | DSP | DATE_SHFT PTR |
| 2 PTRS | NSP | NAME_SHFT PTR |
| | CP | CHAR PTR |
| | PP | PLACE PTR |
| | TS | TIME_SHFT PTR |
| | SP | SLOT PTR |
| | DP | DISP PTR |
| FLAG +3 | KBT | K BIT |
| FLAG +3 | MOD | MODE BIT |
| | IC | INDICATOR CODES |

NOTES: ABBREVIATIONS —  
MO MONTH  
DA DAY  
H MOST SIG BYTE  
L LEAST SIG BYTE

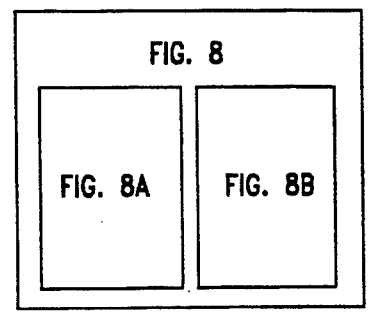

ACTION ITEM DOCKETING DEVICE

This invention relates to the docketing of items requiring future action, such as, for example, bills to be paid.

SUMMARY OF THE INVENTION

According to the invention, an action item docketing device comprises data signal input means, data signal storage, a clock providing clock signals, and a plurality of action item receptacles each open to a user. The device has for each action item receptacle a corresponding action item detector, and a corresponding indicator providing an action item presence signal responsive to the presence of an action item in the corresponding receptacle. The action item detectors, indicators, data signal input means, data signal storage and clock are connected together for the transfer of information among them.

The device further comprises first means for receiving from the data signal input means and for storing in the data signal storage, for a particular receptacle, due date signals representative of a future date for action with respect to an action item; second means responsive to the clock signals for generating and storing a current date signal; and third means for comparing, for each receptacle in turn, its stored due date signals with the current date signal, and for providing, responsive to coincidence of the current date signal with the stored due date signals and to an item presence signal from the corresponding action item detector, an output item due signal, the corresponding indicator being responsive to the output item due signal to be in an item due state.

In a preferred embodiment, the data signal input means comprises, in the storage, an input data signal receiver, signals defining a displayable message form having a modifiable character position, and signals defining a character font providing a plurality of displayable elements; fourth means for controlling the display to display a representation of a message form having a representation of a current element of the character font in the modifiable character position; first key means providing a first advance mode signal; fifth means responsive during display of the message form representation to the first advance mode signal, to signals defining the current element, and to the signals defining the character font for controlling the display thereafter to display in the message modifiable character position a representation of the element of the character font successive to the current element; and sixth means responsive to the fifth means for storing signals defining the successive character font element in the input data signal receiver.

Also in a preferred embodiment, the data signal input means further comprises second key means providing a second advance mode signal; seventh means responsive during display of the message form representation to the second advance mode signal, to signals defining the current element, and to the signals defining the character font for controlling the display thereafter to display in the message modifiable character position a representation of the element of the character font next preceding the current element. The sixth means is responsive to the seventh means for storing signals defining the next preceding character font element in the input data signal receiver.

A displayable message form comprises a plurality of modifiable character positions, and the data signal input means further comprises third key means providing a position shift signal. The fifth means is additionally responsive to the position shift signal for controlling the display to display in a particular message modifiable character position a representation of a successive character font element.

Further in a preferred embodiment, the device provides update mode means providing an offset signal, and updating means. For each receptacle in turn, the third means is further responsive to a comparison of the stored due date signals with the current date signal for providing a date-later signal, and the updating means is responsive to the date-later signal and to the offset signal for deriving from the stored due date signals and the offset signal, updated due date signals and for storing updated due date signals in the storage.

BRIEF DESCRIPTION OF THE DRAWING

FIG. 4 shows a portion of FIG. 3 in more detail;

FIG. 5 shows certain input signals provided to the controller of FIG. 2 by the input keys of FIG. 1;

FIG. 7 shows the calling relationships among program elements of FIG. 3, according to which the controller of FIG. 2 operates in the manner shown in FIG. 6;

FIG. 8 shows a portion of FIG. 4 in further detail;

DETAILED DESCRIPTION OF THE PREFERRED EMBODIMENT

Figure 1:
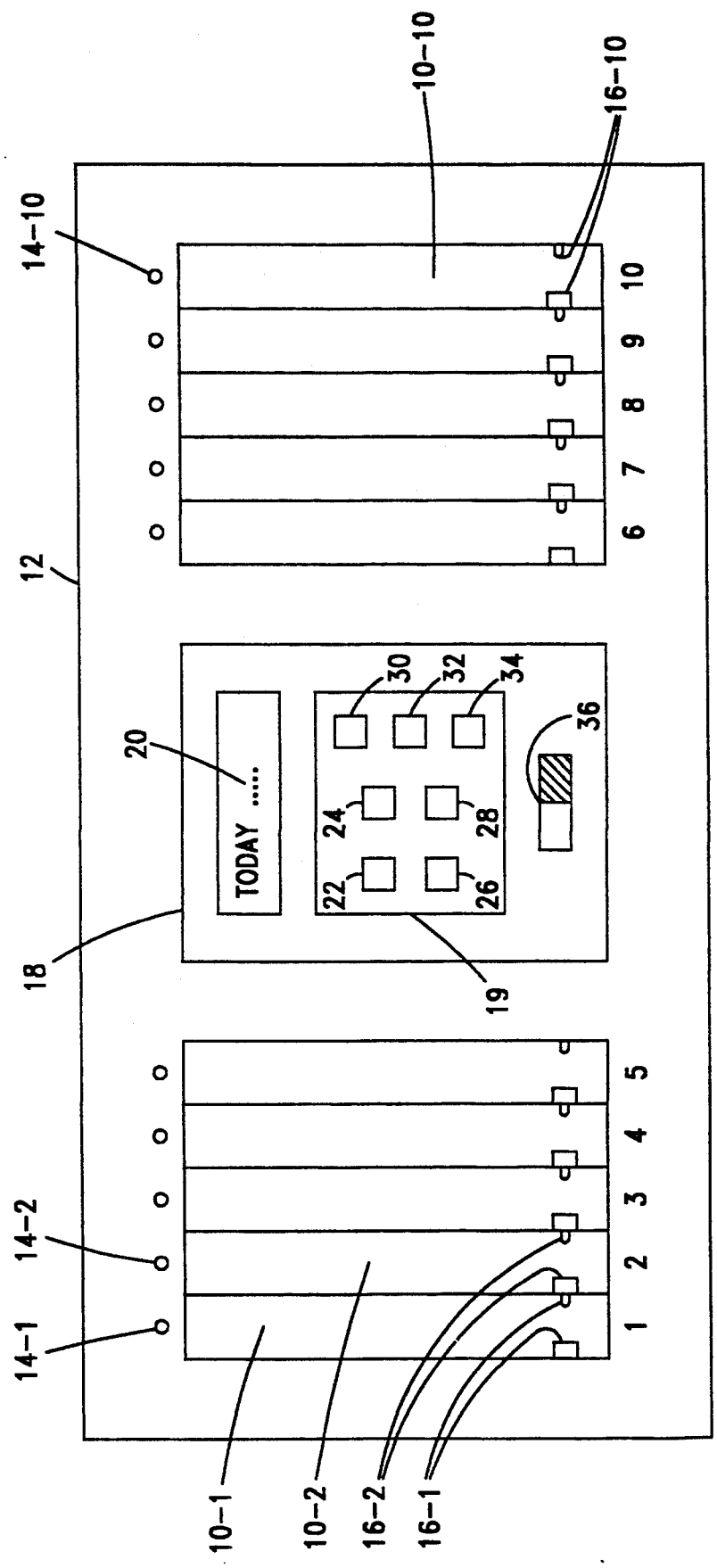
FIG. 1 is a view of the exterior of the device according to the invention, with inputs and outputs.

Referring now to the drawing, and in particular to FIG. 1, the action item docketing device 12 provides ten action item receptacles or slots 10-1, 10-2, through 10-10, opening to the exterior of the device, each for the reception of a physical item, such as a written memorandum or a bill to pay, having associated with it, as known to the device's user, a date in the future on which some action must be taken in connection with the item. Associated with each slot 10 is a visible slot number, from 1 to 10, uniquely identifying each slot to the device user.

Further associated with each slot 10 on the exterior of the device is an indicator light 14-1, 14-2, through 14-10. Each indicator light can display either of two colors (e.g. red and green) and either of three states (constant illumination, flashing illumination, or off). The significance of the displays, and the manner in which the indicators 14 are controlled will be described below.

Within each slot 10 is an action item detector 16. Detectors 16 are desirably optical detectors, but any suitable detector may be used. Each detector 16 senses the presence or absence of an action item in the associated slot, and provides an input signal representative of such presence or absence.

The action item docketing device 12 further provides an external control panel 10 comprising an alphanumeric display 20 and a keypad 19. Keypad 19 provides seven input keys (DATE key 22; TIME key 24; SLOT NAME key 26; DUE DATE key 28; PLUS key 30; SHIFT key 32; and MINUS key 34). The input signals and functions of the keys of keypad 19 will be described below. A MODE slide switch 36 is also provided on panel 18. The setting of this two-position switch (referred to as OFS) is used to determine the automatic updating of due dates, as will be described.

Display 20 has sixteen character positions. Any of a set of predefined messages may be displayed on display 20 during the operation of device 12, as will be described. Certain of these messages may be currently modified during display responsive to actuation of the keys of keypad 19 by the user, as will be described; the current modification of the displayed messages by means of keypad 19 defines alphanumeric information input by the user. Alphanumeric information is not directly input by the user.

Figure 2:
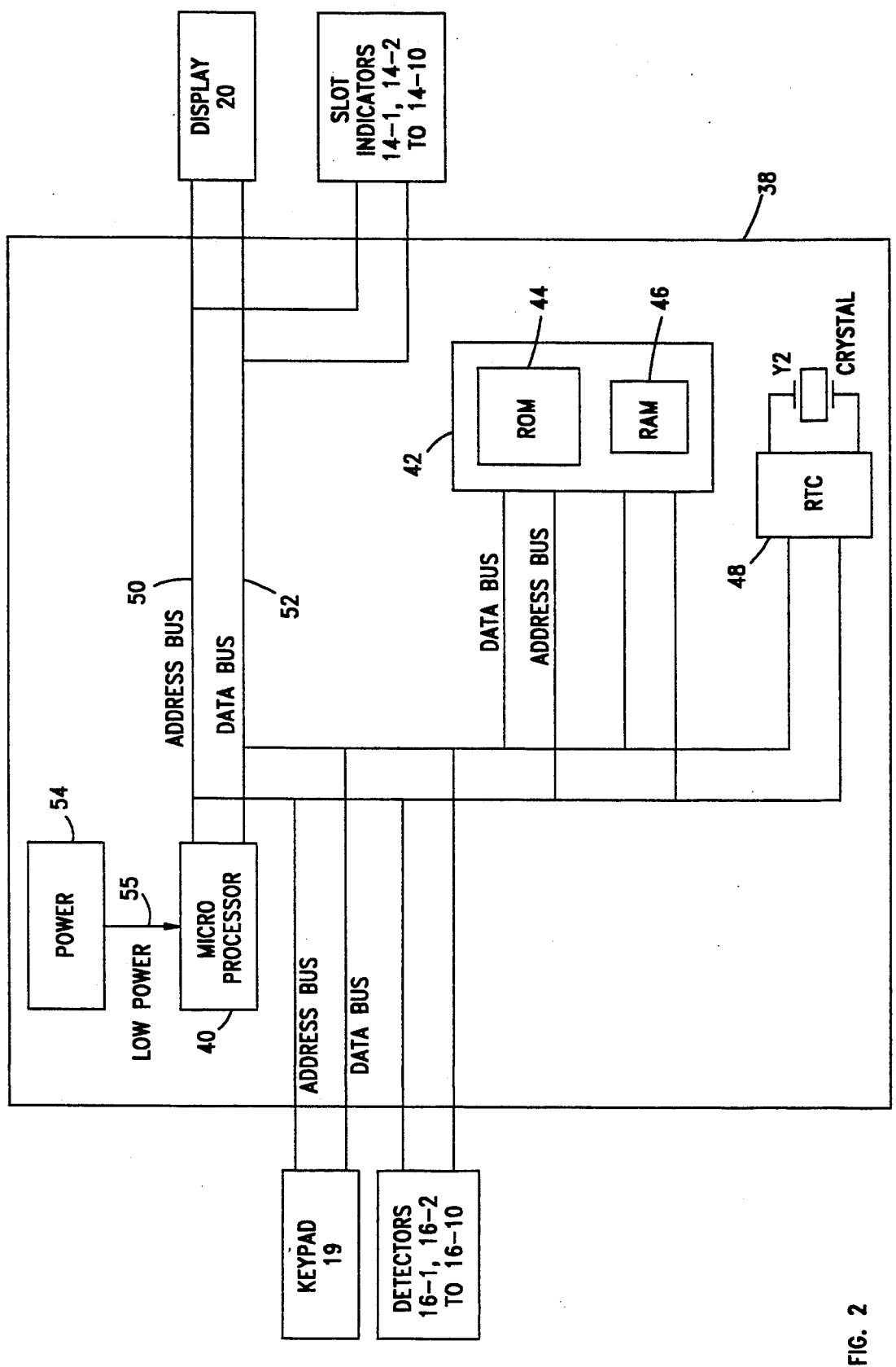
FIG. 2 is a block diagram showing the controller of the device of the invention, with the inputs and outputs of FIG. 1 connected thereto.

Referring now to the block diagram of FIG. 2, a controller 38 is provided in device 12. Controller 38 comprises a conventional microprocessor 40, conventional storage 42 comprising read-only memory 44 and random access memory 46, and a real-time clock 48, all interconnected by means of conventional address bus 50 and data bus 52 for the transfer of information among them. A standard power source 54 is connected to the elements of device 12 by standard power connections, not shown in the drawing, providing both means for connection to standard AC power, and battery power to ensure that stored data is retained in case of interruption of the AC power; in such case power source 54 provides a low power condition interrupt signal to microprocessor 40 in line 55 and the controller enters an "idle" mode to conserve power (IDLE module 215 in FIG. 7).

Keypad 19, detectors 16, display 20 and indicators 14 are also connected to busses 50 and 52. Item detectors 16-1, 16-2, through 16-10; keypad 19 comprising the seven input keys 22, 24, 26, 28, 30, 32, 34; and MODE switch 36 provide input signals to controller 38. Referring to FIG. 5, the input codes provided to controller 38 by each of the keys of keypad 19 are shown.

Alphanumeric display 20 and indicator lights 14-1, 14-2, through 14-10 provide output information as controlled by output signals from controller 38 on busses 50 and 52.

Figure 3:
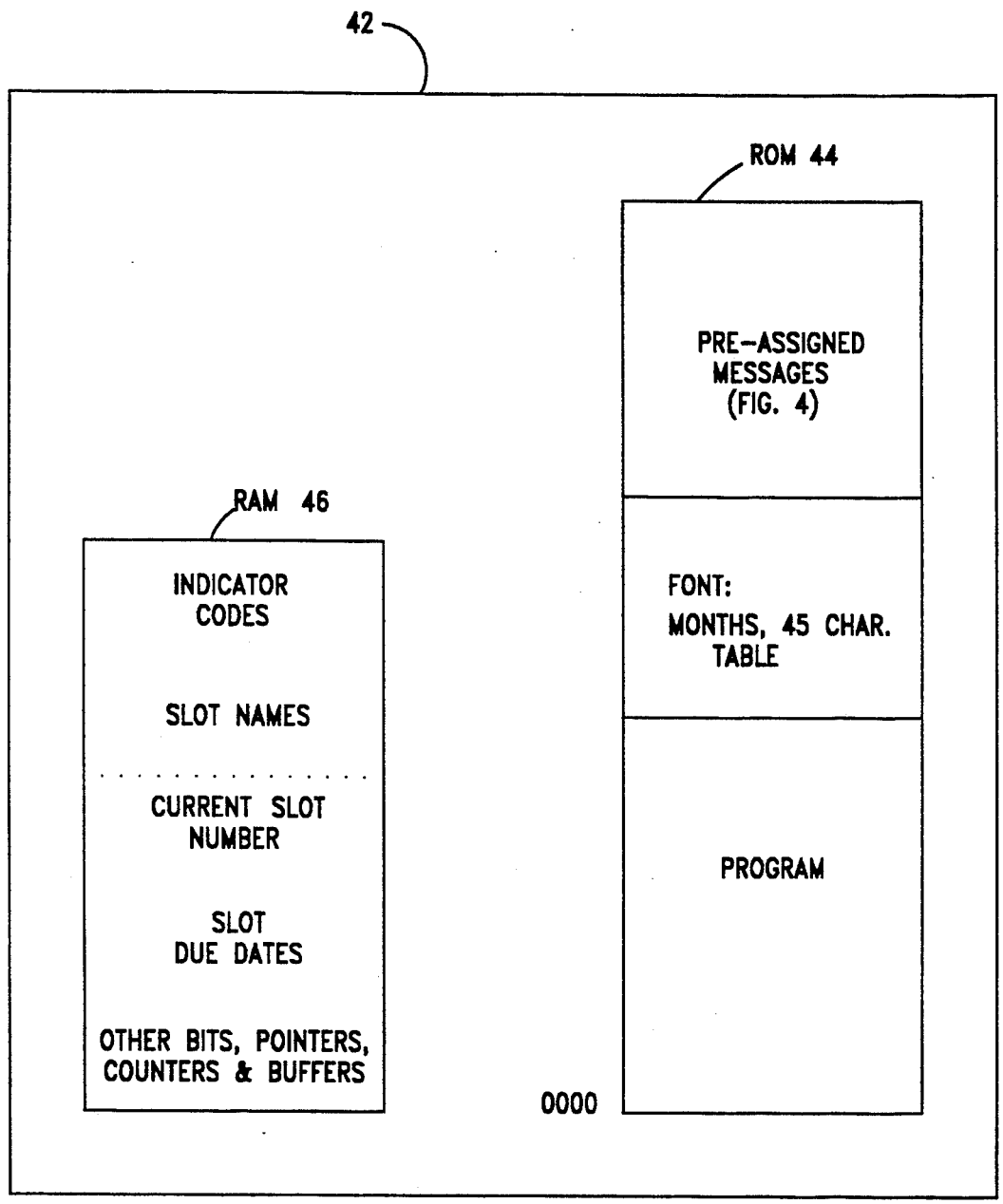
FIG. 3 shows a portion of FIG. 2 in more detail.

Referring now to FIG. 3, the allocation of the RAM 46 and ROM 44 of storage 42 (FIG. 2) is broadly shown. ROM 44 provides stored signals representative of program instructions, and stored ASCII signals representative of predefined messages and of a character font. RAM 46 provides storage for signals representative of pointers, counters and buffers used in current operation, as well as slot names, due dates, status bits and indicator codes for each of the ten slots 10, all to be described.

Responsive to inputs from keypad 19 and detectors 16, microprocessor 40 of controller 38 operates in a well known and conventional manner to access instructions stored, as indicated at PROGRAM, in ROM 44, and to operate in accordance with such instructions.

According to the invention, controller 38 controls the operation of device 12 and in particular to control the operation of display 20 and indicator lights 14. The broad steps of such operation are schematically shown in the flow chart of FIG. 6. The modules or elements of the stored program and the calling relationships of these modules are schematically illustrated in FIG. 7.

Of the message forms (FIG. 4) stored in ROM 44, certain ones comprise, in addition to unmodifiable characters, predefined fields comprising a predefined number of character positions, whose current specific values are user-definable when the message is displayed at display 20 in current operation. Upper case letters and spaces represent predefined characters which may not be modified by the user of device 12; lower case letters and dashes represent characters in predefined fields which may be currently modified by the user during display of the message. For example, message no. 7 ("TODAY dd mon yy") comprises the predefined characters TODAY which cannot be altered by the user, together with predefined fields represented by "dd" "mon" and "yy" which during set-up of device 12 can be modified by the user during display of the message by reference to the ROM character font, in a manner to be described. In display, the modifiable fields "nn" etc. are initialized to "01", "JAN" etc. as appropriate, if no values have previously been defined by the user. The modifiable fields are separated by unmodifiable spaces.

The characters of the stored predefined messages (FIG. 4) and the elements of the stored character font are stored in ROM 44 in the form of ASCII codes. The font comprises the ASCII codes for twelve three-letter month names (JAN, FEB, MAR etc.) and a 45-character table providing the ASCII values for the digits from 0 to 9, for the characters of the alphabet, and for various punctuation marks. These font values are used to control display 20 to represent user input to the variable portions of displayed messages, in order to display slot numbers, slot names, dates and so forth as required.

The stored predefined messages and the characters of the stored font are addressable by controller 38, generally using addresses stored in RAM 46, generated in the course of current operation of device 12.

The device user, by actuating the keys of keypad 19, can define the current content of the modifiable fields of the displayed message. Alphanumeric data is not directly entered by the user. Rather, the SHIFT key is used to address particular character positions, and the PLUS and MINUS keys are actuated repeatedly to cycle through possible characters to be displayed in the character position until the desired input character is displayed.

Figure 11:
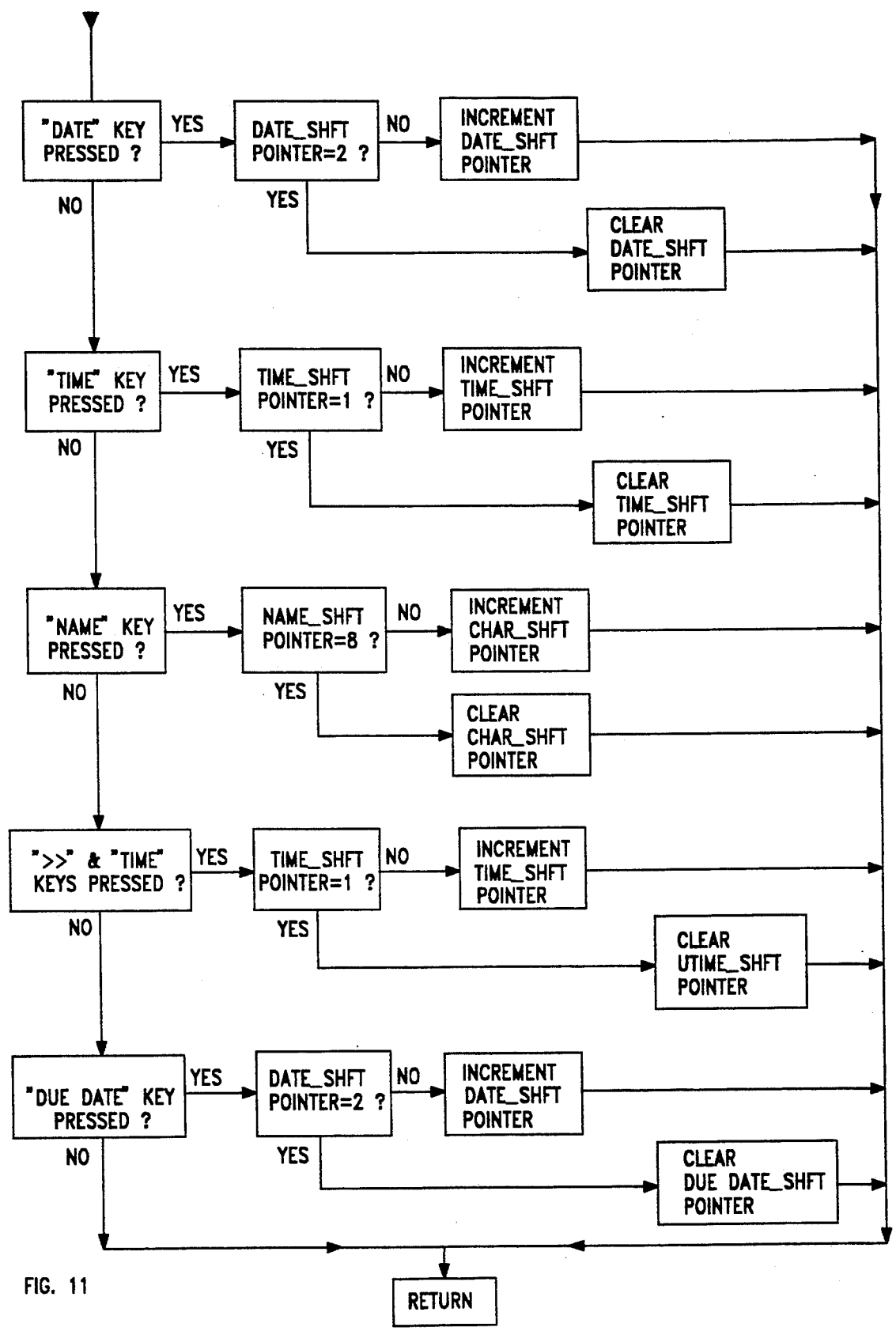

Actuation of SHIFT key 32 results in the operation of controller 38 according to SHIFT module 207 (FIG. 7 and FIG. 11); by addressing successive display positions controller 38 permits the user to move to the next modifiable character position to the right (or to return to the leftmost modifiable character from the rightmost), or at certain points in the operation of device 12, to omit entering information relating to a particular slot 10.

Figure 9:
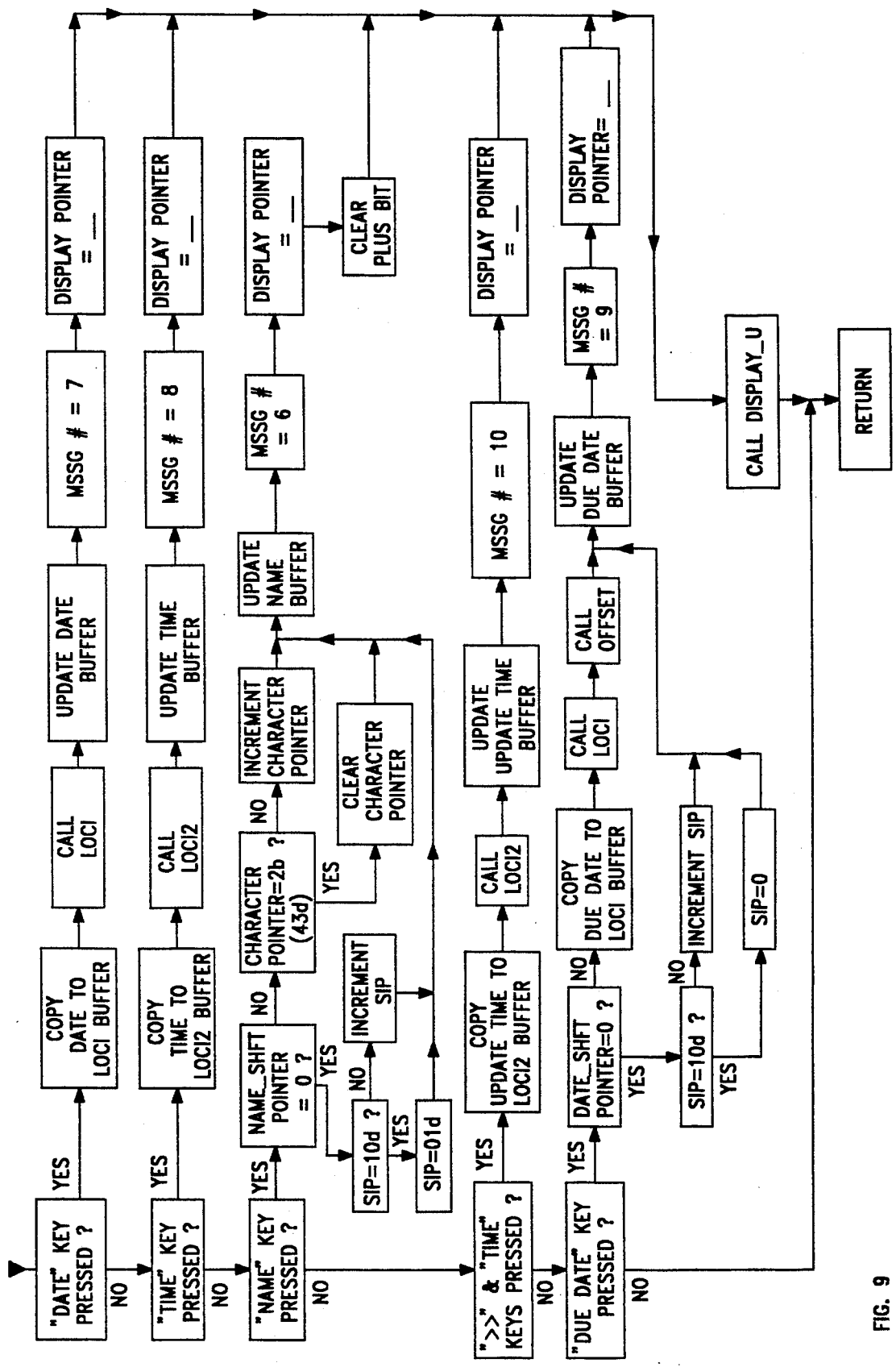
FIGS. 9, 10, 11, 12, and 13 are detailed flow charts of certain portions of FIG. 7.
Figure 10:
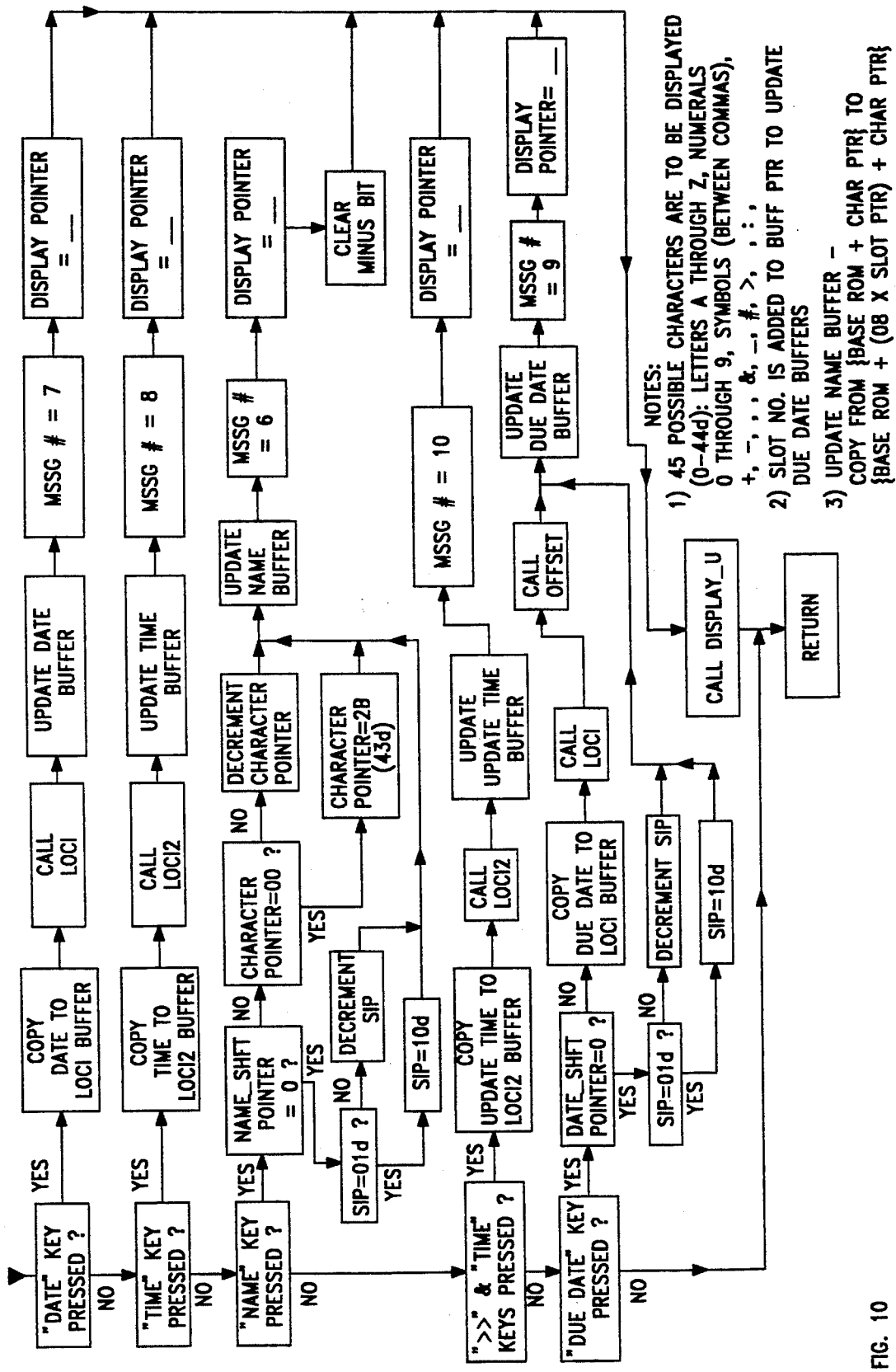

The particular characters that are cyclically displayed in each display position are a function of the context of the characters in the displayed message. For example, repeated actuation of the PLUS key will result in operation of controller 38 according to PLUS module 206 (FIG. 7 and FIG. 9) stored in ROM 44 at PROGRAM; when user input defining a month is expected (in setting the current date, or in setting a due date in association with a slot), controller 38 addresses the font stored in ROM 44 to provide the cyclic display of JAN, FEB etc. When the user is satisfied with the display he ceases to actuate the key and the currently displayed value (e.g. SEP) is retained in RAM 46 as the stored value. Similarly, repeated actuation of MINUS key 34 will cause repeated execution of MINUS module 208 (FIG. 7 and FIG. 10).

Under the control of PLUS module 206 or MINUS module 208, during the display of Message 6 ("Slot nn name—") the numbers from 01 to 10 (but not the rest of the characters in the font table) are cyclically displayed in the field position of "nn", "nn" being initialized to "01".

During the display of Message 6 ("SLOT nn name—"), after values for "nn" have been input in the manner described, further actuation of the SHIFT key 32 addresses the first of the eight character positions of the definable slot name, and actuation of MINUS key 34 during the display of Message 6 ("SLOT nn name—"), the characters of the 45-character font table are cyclically addressed for each position in reverse order, causing the first displayed character to cycle backward through the set of possible characters; for example, if the initially displayed character is "Q", the display will successively be P, O, N etc. When the intended character is displayed, the user ceases to actuate the MINUS key 34. The ASCII code of the displayed character (or in some cases the address of the ASCII code in ROM 44) is then stored in RAM 46 for future use as appropriate in the context of the displayed message. The remaining characters may be defined in the same way. (The modifiable fields of Message 6 may equally well be defined by use of the PLUS key 30. The above description has been given by way of example only.)

The currently modified values of the modifiable character positions of a currently displayed message are stored in RAM 46 as the current time, date, slot name, due date, etc., as appropriate to the message. These values are retained in RAM 46 until later modified by the user, or modified responsive to signals from clock 48. Thus, by use of a simple five-key keypad 19 within the context of particular messages currently displayed on display 20, the user of device 12 can provide input alphanumeric information to the device and thereby control its current and future operation.

Referring now to FIG. 8, RAM 46 stores up to 10 slot names, each defined by the device user and associated with a particular slot 10. Each name may be up to eight characters long; when a name is defined for a particular slot by the device user in the manner that has been described, the ASCII values of the characters are copied one by one from the ROM font during display of Message 6 in response to actuation of the PLUS, MINUS and SHIFT keys of keypad 19, to be stored in RAM 46 at the corresponding slot name location.

RAM 46 further stores up to ten due dates (month and day being separately stored as MO and DA), each due date being defined by the device user and associated with a particular slot 10 in the context of the display of Message 9 (FIG. 4). When a due date is defined for a numbered slot by the device user, it is stored in RAM 46 in the form of addresses of the appropriate ASCII values in ROM 44 for the display of the defined date. For the month, the address of the first character only of the three-character month abbreviation in ROM 44 is stored.

Further, RAM 46 stores ten internally defined indicator codes IC corresponding to the ten slots 10 of device 12. Each indicator code IC may have one of the following values:
 000: OFF
 001: Green
 010: Flashing Green
 011: Red
 100: Flashing Red The indicator codes are used to control the indicators 14 on the exterior of device 12, as will be described.

Further, RAM 46 provides storage for a Character Pointer CP, Display Pointer DP, Place Pointer PP, Slot Pointer SP, Slot Index Pointer (sip H, sip L), Status Buffer ST, and Date, Time and Item Buffers, and other buffers to be described, all employed during the operation of controller 38 according the instructions stored as PROGRAM in ROM 44. The Character Pointer holds the address of that one of the characters in the character font in ROM 44 which is to be displayed. The Display Pointer holds the starting address of the byte to be currently displayed; the Place Pointer points to one of the sixteen character locations on display 20.

The functions of the signals stored at these various locations will appear in what follows.

More in detail as to the operation of controller 38, and referring to FIG. 7, in response to actuation of any key of keypad 19, controller 38 operates according to the KEY PRESS program module 201 and KEY CODES module 202 provided in ROM 44 to ascertain which key was pressed. In response to actuation of the DATE, TIME, SLOT NAME and DUE DATE keys of keypad 19, appropriate prompt messages are displayed to prompt the device user to enter further information. The identity (key-code) of the pressed key is saved in key-buffer KB (FIG. 8). Controller 38 operating according to KEY 2 module 205 and KEY CODES module 202 ascertains whether a second key (specifically PLUS, MINUS or SHIFT keys 30, 34, and 32) has been actuated. If no second key is pressed within a set time period (desirably ten seconds), controller 38 operating according to NO KEY module displays Message 4 ("PRESS +, — or >>") to prompt the user. If no second key is pressed in response to the prompt, controller 38 controls display 20 to display Message 8 ("TIME NOW hh:mm P"), taking the values of the variable fields from its own internal information derived from clock 48. Message 8 is the default message of device 12.

In response to actuation of PLUS key 30, controller 38 operating according to PLUS module 206 (FIG. 9) controls display 20 to display a message appropriate to the key (DATE, TIME, SLOT NAME, DUE DATE, or SHIFT) previously actuated, modified according to the actuation of the PLUS key, and awaits input from the user. In response to actuation of MINUS key 34 (FIG. 1), controller 38 operating according to MINUS module 208 (FIG. 10) controls display 20 to display a message appropriate to the key previously actuated, modified according to the actuation of the MINUS key, and awaits input from the user.

If no second key is pressed within a set time period, controller 38 operating according to NO KEY module 204 (FIG. 7) displays the prompt Message 4 ("PRESS +, — or >>"), then repeats the display of the previous key-specific message and again awaits a second key input. If none is received during a set time period, the key buffer KB (FIG. 8) is cleared and the device reverts to the default display.

Failure to actuate a key within the waiting period is interpreted by controller 38 to means that the user has completed his input; that is, it is interpreted as an "enter" or "execute" input.

Operation

Device 12 has two general modes of operation: initializing, as at power up, and ongoing, after its initial state has been set by the device user. To initialize device 12, the user must provide input representing the current date and time, and names for one or more of the action item slots; due dates for current action items may also be provided at this time or later.

Initializing Device 12

Figure 6:
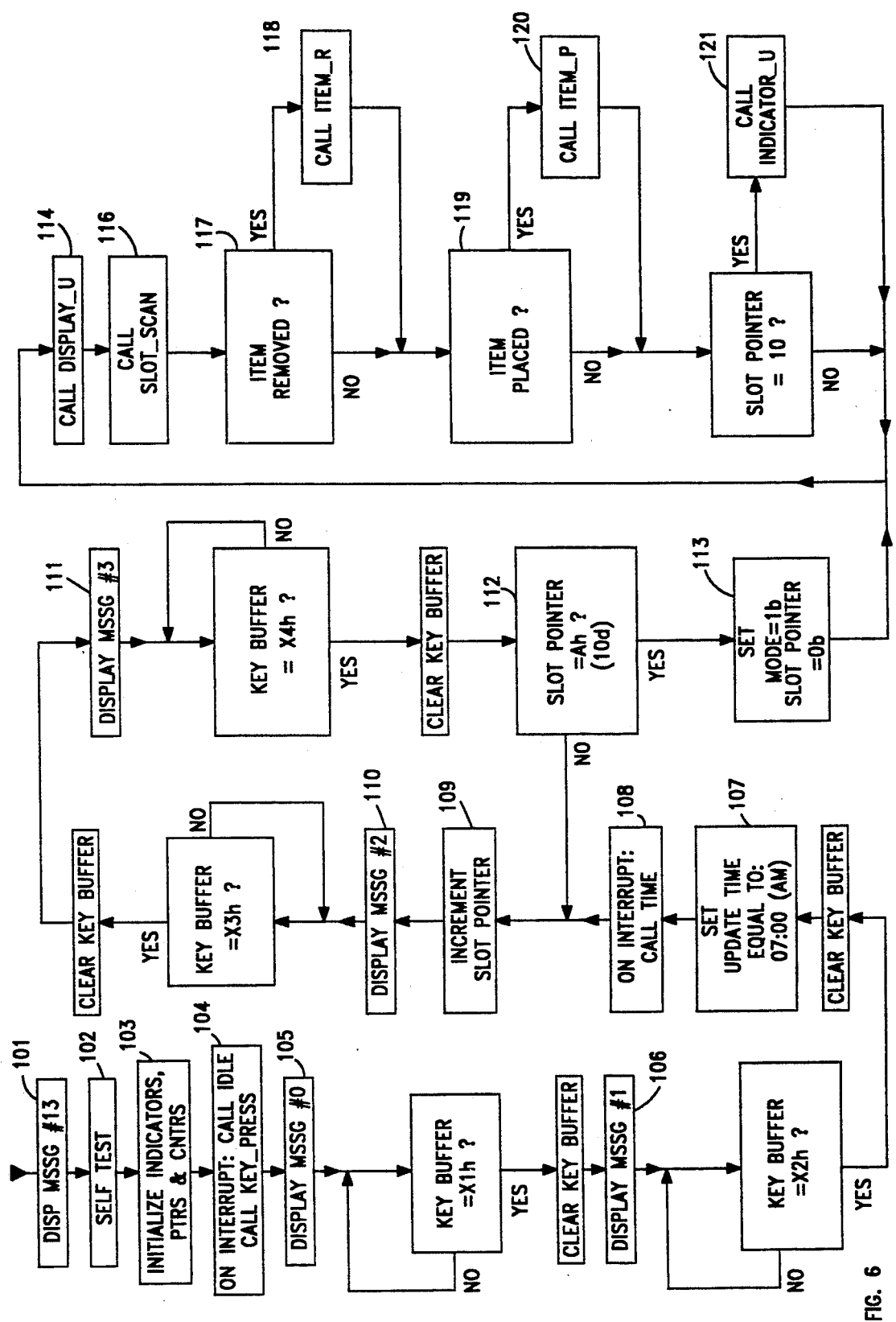
FIG. 6 is a flow chart showing the operation of the device according to the invention.

Referring now to FIG. 6, when device 12 is initialized (as upon power-up) controller 38 accesses the stored messages (FIG. 4) in ROM 44, and controls display 20 (step 101, FIG. 6) to display the (unmodifiable) Message 13: "SELF TEST". At this time controller 38 executes a self-test procedure (step 102), and initializes appropriate indicators, pointers and counters in RAM 46 (step 103). In particular, the mode bit, stored as MOD in RAM 46 (FIG. 8), is set to 0, indicating set-up mode. (The handling of certain inputs by controller 38 operating according to KEY PRESS module 201 differs in set-up and in current operation, according to the value of MOD.) On the completion of these steps, at step 105, message 0 ("PRESS DATE KEY") is displayed to prompt the user. Unless Date key 22 is pressed, operation will not continue.

To initialize device 12, the user must input the current date and time. When the user presses DATE key 22, controller 38 operating according to KEY PRESS module 201 (FIG. 7) controls display 20 to display Message 7 ("TODAY dd mon yy" in the form "TODAY Jan. 1, 1991") to prompt the user to input the current date by means of actuation of PLUS key 30, MINUS key 34, and SHIFT key 32 whose functions have been previously described. The information defining the current date is stored as entered in RAM 46 in the Date Buffer DAB (FIG. 8); this is done by controller 38 under control of the PLUS or MINUS modules 206, 208 and SHIFT module 207.

After the current date has been stored, prompt Message 1 ("PRESS TIME KEY") is displayed on display 20 (FIG. 6, step 106). Unless Time key 24 is pressed, operation will not continue. Upon the user's actuating TIME key 24, controller 38 operating according to KEY PRESS module 201 (FIG. 7) controls display 20 to display Message 8 ("TIME NOW hh:mm P") with "hh:mm" initialized to "01:01" and "P" initialized to a blank, indicating AM. The user is thereby prompted to actuate the PLUS, MINUS and SHIFT keys as previously described to input the current time; the current time is stored in RAM 46 in Time Buffer TB (FIG. 8). The stored current date and time are thereafter kept current by controller 38 by reference to the output of real time clock 48. At step 108 (FIG. 6) an interrupt, generated within controller 38 responsive to passage of a defined time interval, causes TIME module 220 (FIG. 7) to be accessed in ROM 44; operating according to TIME module 220, controller 38 updates the Time Buffer TB in RAM 46.

During initializing of device 12, the update time is set equal to 07:00 AM as a default value. This is the hour at which the transition from one date to the next is defined to occur with respect to due dates, causing the slot indicators 14 to be updated during ongoing operation of device 12 (after setup has been completed), as will be described. At step 107 (FIG. 6) Message 10 is displayed ("DUE TIME 07:00 P"). The user can modify this update hour by means of the SHIFT, TIME, PLUS and MINUS keys of keypad 19 in the manner already described. If the user actuates no keys within a set time period, the controller assumes that the default due time is confirmed.

After the default update hour has been confirmed (that is, not modified) or modified by the user. Slots are named and due dates stored for each slot 10 in turn.

Slot Pointer SP (stored in RAM 46; FIG. 8) is incremented to "01" (step 109, FIG. 6) (at Step 103, it is initialized to "00"). Message 2 ("PRESS NAME KEY") is displayed on display 20 (step 110). Unless the Name key 26 is pressed, operation will not continue. Upon the user's actuating SLOT NAME key 26, the key code is saved in the key buffer KB (FIG. 8), and controller 38 operating according to the KEY PRESS module 201 controls display 20 to display Message 6 ("SLOT nn name—") with "nn" initialized to "01". An eight character name can be defined by the user, in the manner already described, by use of the PLUS, MINUS and SHIFT keys 30, 34, and 32. A name of fewer than eight characters can be defined; if the user actuates no further keys within a set time period, the controller assumes that the characters already input define the complete name.

After the user has input a name to be associated with slot 10-1, Message 3 is displayed ("PRESS DUE KEY"; step 111, (FIG. 6). Unless Due Date key 28 is pressed, operation will not continue. Upon the user's pressing DUE DATE key 28, controller 38 operating according to KEY PRESS module 201 controls display 20 to display Message 9 ("nn DUE mon dd") with the current slot number 01 (indicated by Slot Pointer SP, FIG. 8) in the character positions designated "nn", and with "JANUARY 01" in the remaining modifiable fields. By actuating the PLUS, MINUS and SHIFT keys in the manner described, the user can modify the current display of Message 9 to provide input representing the date on which an action item to be stored in the numbered slot will fall due for action. This due date is stored in RAM 46 in the Due Date Buffers, at a location associated with the slot number indicated by Slot Pointer SP.

By incrementing the slot pointer (step 109), controller 38 prompts the user to name and assign due dates to all ten slots. The names and due dates are stored by controller 38 in RAM 46 at the indicated locations (FIG. 8). If the user does not wish to name all slots at this time, he may actuate Shift key 32 instead of Name key 26; controller 38 operating according to KEY PRESS module 201 will control display 20 to display Message 11 ("ERR KEY SEQUENCE") and will thereafter increment the slot pointer.

Thus for each slot 10 identified by a visible slot number on the device exterior, the user provides a name identifying the action item which is to be stored in the slot, and a due date for the action item.

After the slot pointer has reached "10", it is reset to "0" (step 113).

At the conclusion of set-up the mode bit MOD (FIG. 8) is reset to 1 (step 113).

At step 114, the DISPLAY U(pdate) module 222 (FIG. 7) is called to display the current time (default Message 8). (This module is used for all display operations, but reference to it has not been made specifically in the foregoing description.) This message generally indicates to the user that an operation has been completed. In particular at this point in the device operation Message B indicates that set-up has been completed.

Ongoing Operation of Device 12

After device 12 has been initialized, controller 38 as controlled by program elements stored in ROM 44 loops through a scanning operation, beginning at step 116. During this scanning operation, each slot 10 is scanned in turn for presence of an action item; the removal or placing of an action item into slot 10 since the previous scan is detected; the stored associated due date is compared with the current date; and the associated indicator code IC (FIG. 8) is updated. (This scan operation may be interrupted at any time by the user, to modify or add slot names and due dates.) At the completion of the scan of the ten slots 10 (which is carried out in about two seconds in most cases, in the absence of interrupts or delays), all the indicators 14 (FIG. 1) are controlled in accordance with the corresponding stored indicator codes IC (FIG. 8) to display the current status of the action items.

The indicator condition of no illumination (OFF) indicates (at the end of a thirty second delay, to be described, after removal of an action item) that no action item is found to be present in the corresponding slot 10. The constant green condition indicates that an action item is present in the slot, and that a due date has been stored for such slot in RAM 46 as previously described. The flashing green condition indicates that an action item is present in corresponding slot 10, but no due date has been stored in RAM 46 for that slot. The constant red condition indicates that the due date for the slot has arrived (is equal to today's date); the flashing red condition indicates that the due date has passed.

Figure 12:
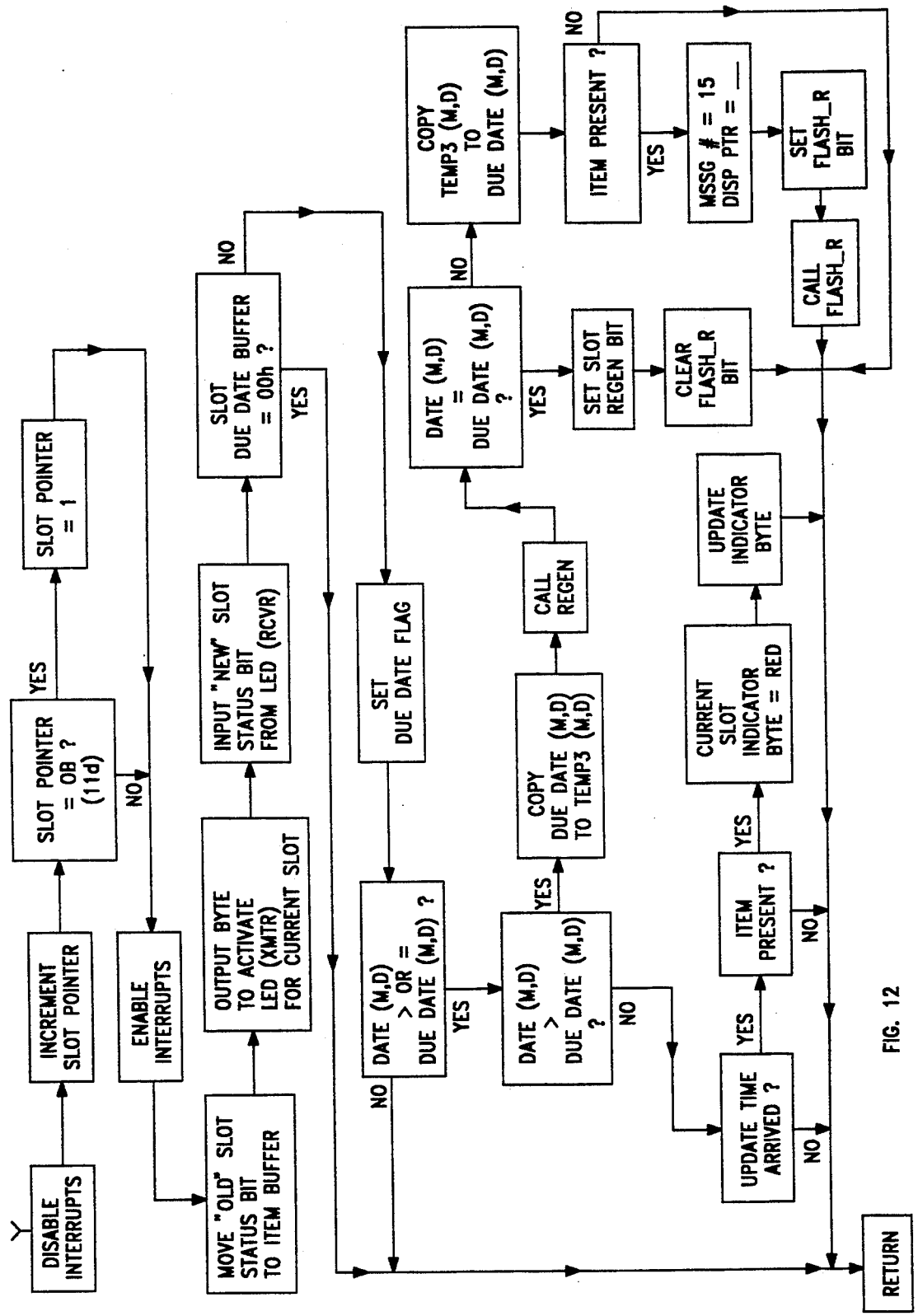
Figure 13:
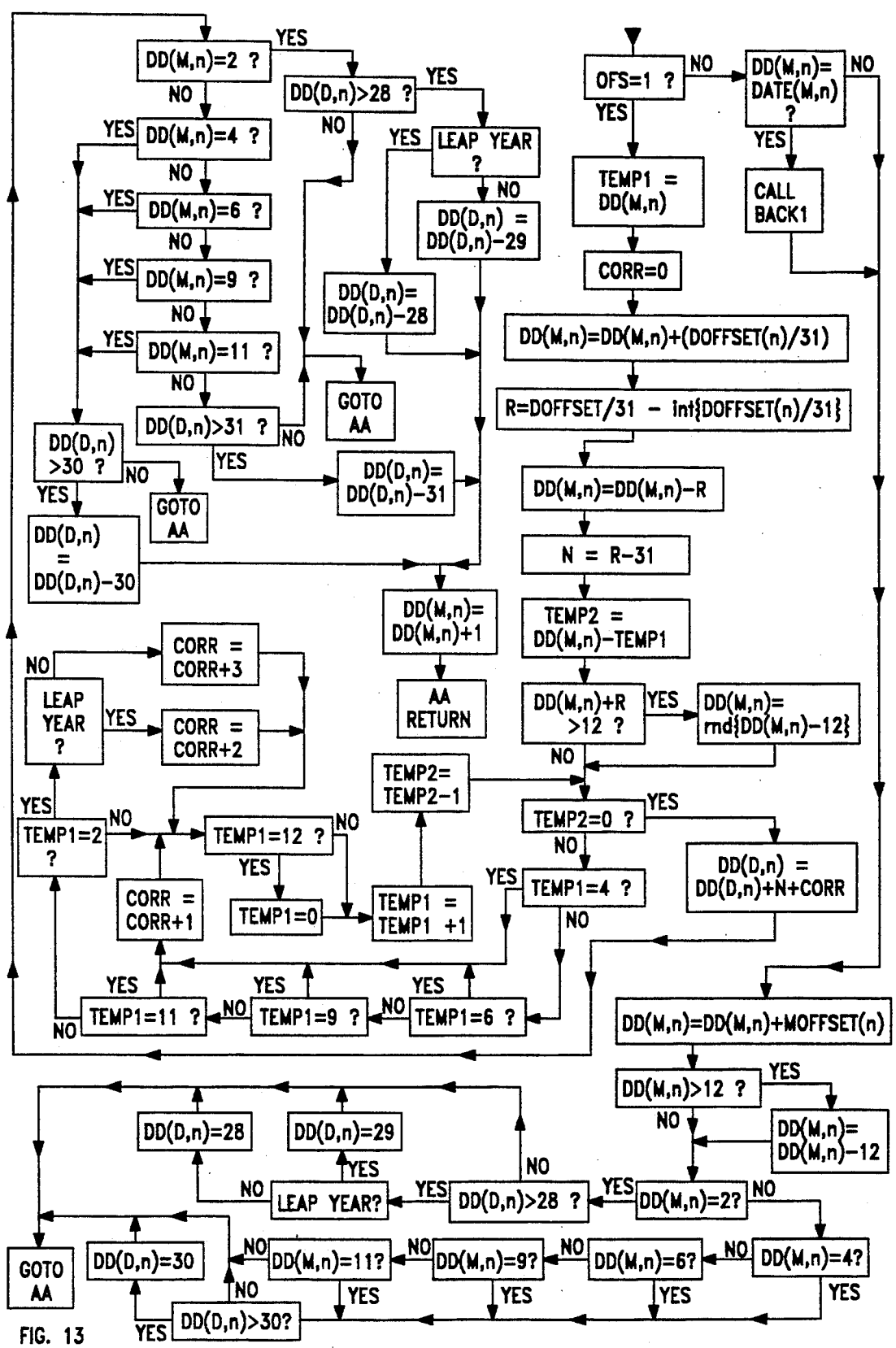

More in detail, operating (step 116 of FIG. 6) according to the SLOT SCAN program module 209 (FIG. 7 and FIG. 12), controller 38 increments the Slot Pointer SP. The detector 16 for the currently indicated slot 10 is activated. The input signal from detector 16 indicates presence or absence of an action item in the slot. In response to this input, the Status Buffer ST H, ST L (FIG. 8) is updated to indicate current presence or absence of an action item in the slot. The corresponding slot due date buffer is checked; if a due date has been stored for the slot, a due date flag is set. The due date is compared with the current date, taking account of the current time and the update hour; if the due date has arrived, the corresponding indicator code IC is set to "red"; if the due date has passed, the IC is set to "flashing red".

The status of each slot (whether an item is present or not) as found on the previous scan has been previously stored in the Item Buffer of RAM 46 (FIG. 8). At steps 117 and 119 (FIG. 6) the current status is compared with the previous status to determine whether an action item has been removed from the slot since the last scan, or an action item has been placed in the slot since the last scan.

If at step 117 an action item is found to have been removed from the currently indicated slot 10, then at step 118 a 30-second delay is started. Controller 38 controls display 20 to display Message 5 ("SLOT nn RESET ss"). The current slot number is displayed at "nn", and the number of seconds left in the delay (stored at S in RAM 46, FIG. 8) is displayed at "ss". The device user has 30 seconds in which to replace the item, during which the indicator code stored for that slot will not be changed by controller 38. If the item is replaced within 30 seconds, the device scanning operation resumes without change. If not, the corresponding indicator code IC is changed to OFF before scanning is resumed.

If at step 120 an action item is found to have been placed in the currently indicated slot since the previous scan, the controller checks whether a due date has been stored in the Due Date Buffer of RAM 46 (FIG. 8) for that slot. If none has been stored, the corresponding indicator code IC is set to display "flashing green" and Message 12 ("PROGRAM SLOT") is display 20 to prompt the user to provide a due date. If a due date has been stored, it is compared with the current date, taking account of the current time and the stored update time. The indicator code IC is updated accordingly: if the due date has arrived, a "red" value is stored in the currently slot indicator code IC (FIG. 8). If the due date has passed, controller 38 controls display 20 to display Message 15 ("DATE HAS EXPIRED") and sets the indicator code to "flash red".

Items may be placed into slots at any time. The presence of a newly placed item will be detected the next time controller 38 scans that slot during its slot scan (steps 114–121, FIG. 6).

Automatic Updating of Due Date

It is contemplated that when the device 12 of the invention is employed to docket payment of bills, it will commonly occur that certain bills recur regularly, as for example rent, mortgage payments, or utility bills. In order to make the docketing of such bill payments particularly convenient, a feature of the invention is provision of automatic resetting of the due date for any particular slot upon removal of the item from the slot. Then, when the next bill from the same entity is placed in the slot, the user need not again enter a due date for it; an updated date has already been provided by controller 38, which recognizes the placing of the new item on the next slot scan, and activates the corresponding indicator 14 to show that a due date is already stored.

The user, by setting Mode switch 36 on panel 18 of device 12 (FIG. 1), chooses to have such automatic resetting be based on either a monthly or daily cycle. For example, if the user wishes to pay his recurring bills always on the first of a month, when setting up device 12 for the particular slot 10, he sets the Mode switch 36 to "month" and enters "JULY 01" as a due date for a particular slot 10. On that day (or before) he removes the action item to pay it. The removal of the item is detected during the next slot scan. After a 30-second delay, the corresponding indicator code is set to OFF, and at the end of the scan the corresponding indicator 14 is turned off. On the day after the stored due date, the due date is internally reset by controller 38, operating according to REGEN module 211, and with reference to the state of Mode Switch 36; in this example "AUGUST 01" will replace "JULY 01".

On the other hand, a user may wish to pay recurring bills at a fixed daily interval, as for example 45 or 90 days. He sets the Mode Switch 36 to "daily", and thereafter enters, for a particular slot 10, a due date. Controller 38, operating according to REGEN module 211 and the state of Mode Switch 36, computes the interval between the date on which the due date is entered, and the due date, and uses this interval for resetting. For example, if the user on June 15 enters a due date of "JULY 13", on July 14 (whether or not the action item has been removed) controller 38 will reset the due date to "AUGUST 10".

A slot may be renamed at any time, by actuating SLOT NAME key 26, which initiates the display of the slot name Message 6, to be modified by the user as described above for the setup procedures. Actuation of NAME key 26 interrupts the slot scan loop, which will be resumed after the slot name has been redefined. Due dates may also be reset at any time.

What is claimed is:

1. An action item docketing device comprising
   data signal input means,
   data signal storage,
   a display,
   a clock providing clock signals, and
   a plurality of action item receptacles each open to a user,
   said device having for each said action item receptacle a corresponding action item detector and a corresponding indicator,
   said action item detector providing an action item presence signal responsive to the presence of an action item in the corresponding said receptacle,
   said action item detectors, said indicators, said data signal input means, said data signal storage, said display and said clock being connected together for the transfer of information among them; and
   said device further comprising
      first means for receiving from said data signal input means, and for storing in said data signal storage, for a particular said receptacle, due date signals representative of a future date for action with respect to an action item,
      second means responsive to said clock signals for generating and storing a current data signal,
      third means for comparing, for each said receptacle in turn, said due date signals stored for said receptacle with said current date signal, and for providing, responsive to coincidence of said current date signal with said due date signals stored for said receptacle, a coincidence signal, and for providing, responsive to said coincidence signal and to said action item presence signal from the corresponding said action item detector, an output first state signal,
      said output first state signal causing said indicator corresponding with said receptacle to be in a first indicator state.

2. The device of claim 1 wherein said data signal input means comprises
   in said storage,
      signals defining a displayable message form having a modifiable character position, and signals defining a character font providing a plurality of displayable font elements,
   fourth means for controlling said display to display a representation of said message form having a representation of a currently addressed said font element in said modifiable character position,
   first key means for providing a first advance mode signal,
   fifth means responsive during said display of said message form representation to said first advance mode signal, to signals defining said currently addressed font element, and to said signals defining said character font for controlling said display thereafter to display in said message modifiable character position a representation of the successive said font element stored in said character font successive to said currently addressed font element, and
   sixth means responsive to said fifth means for providing signals defining said successive character font element to said first means.

3. The device of claim 2 wherein said data signal input means further comprises
   second key means for providing a second advance mode signal,
   seventh means responsive during said display of said message form representation to said second advance mode signal, to signals defining said currently displayed font element, and to said signals defining said character font for controlling said display thereafter to display in said message modifiable character position a representation of the next preceding said font element stored in said character font next preceding said currently displayed font element,
   said sixth means being responsive to said seventh means for providing signals defining said next preceding character font element to said first means.

4. The device of claim 2 wherein said displayable message form comprises a plurality of said modifiable character positions, and
   said data signal input means further comprises
   third key means for providing a position shift signal,
   said fifth means being additionally responsive to said position shift signal for controlling said display to display in a particular said message modifiable character position said representation of said successive character font element.

5. The device of claim 3 wherein said displayable message form comprises a plurality of said modifiable character positions, and
   said data signal input means further comprises
   third key means providing a position shift signal,
   said fifth means being additionally responsive to said position shift signal for controlling said display to display in a particular said message modifiable character position said representation of said successive character font element,
   said seventh means being additionally responsive to said position shift signal for controlling said display to display in a particular said message modifiable character position said representation of said next preceding character font element.

6. The device of claim 1, further comprising update mode means for providing an offset signal, and updating means,
   for each said receptacle in turn, said third means being further responsive to a comparison of said stored due date signals with said current date signal for providing a date-later signal, and
   said updating means being responsive to said date-later signal and to said offset signal for deriving from said stored due date signals and said offset signal, updated due date signals and for storing said updated due date signals in said storage.

* * * * *